(12) United States Patent
Mital et al.

(10) Patent No.: US 10,309,278 B2
(45) Date of Patent: Jun. 4, 2019

(54) METHOD FOR DESULFURIZATION OF SELECTIVE CATALYTIC REDUCTION DEVICES

(71) Applicant: GM Global Technology Operations LLC, Detroit, MI (US)

(72) Inventors: Rahul Mital, Rochester Hills, MI (US); Gongshin Qi, Troy, MI (US); Anil Yadav, Bangalore (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/723,747

(22) Filed: Oct. 3, 2017

(65) Prior Publication Data

US 2019/0101034 A1  Apr. 4, 2019

(51) Int. Cl.
| | |
|---|---|
| *B01D 53/86* | (2006.01) |
| *B01D 53/94* | (2006.01) |
| *F01N 3/08* | (2006.01) |
| *F01N 3/10* | (2006.01) |
| *F01N 3/20* | (2006.01) |

(52) U.S. Cl.
CPC ....... *F01N 3/0885* (2013.01); *B01D 53/8609* (2013.01); *B01D 53/94* (2013.01); *F01N 3/105* (2013.01); *F01N 3/208* (2013.01); *B01D 2251/2062* (2013.01); *B01D 2255/20761* (2013.01); *B01D 2255/40* (2013.01); *F01N 2900/1602* (2013.01); *F01N 2900/1614* (2013.01)

(58) Field of Classification Search
CPC ............ B01D 53/9418; B01D 53/9422; B01D 2258/01; B01L 23/90; B01L 27/28; B01L 29/90; B01L 38/00; B01L 38/04; B01L 38/08; F01N 2260/04; F01N 3/206; F01N 3/2066; F01N 2250/02; F01N 2560/026; F01N 2610/02
See application file for complete search history.

(56) References Cited

U.S. PATENT DOCUMENTS

| | | | | |
|---|---|---|---|---|
| 5,270,272 | A * | 12/1993 | Galperin | ................. B01J 29/90 208/140 |
| 9,784,157 | B2 * | 10/2017 | Norton | ............... B01D 53/9409 |
| 2001/0052232 | A1 * | 12/2001 | Hoffmann | ........... B01D 53/9431 60/285 |
| 2004/0123590 | A1 * | 7/2004 | Tabata | ................... F02D 41/028 60/295 |
| 2005/0144934 | A1 * | 7/2005 | Nakatsuji | .............. F01N 3/0885 60/295 |
| 2005/0153828 | A1 * | 7/2005 | Uekusa | .................... F01N 3/023 502/60 |
| 2007/0000237 | A1 * | 1/2007 | Toshioka | ........... B01D 53/9431 60/285 |
| 2017/0362979 | A1 * | 12/2017 | Nakada | .............. B01D 53/9422 |
| 2018/0030911 | A1 * | 2/2018 | Nakada | ..................... F01N 3/20 |

\* cited by examiner

*Primary Examiner* — Timothy C Vanoy
(74) *Attorney, Agent, or Firm* — Cantor Colburn LLP (57) ABSTRACT

Described herein is a desulfurization method for desulfurizing a SCR device treating an exhaust gas. The desulfurization method includes injecting a reductant into the exhaust gas upstream from or into the SCR device and increasing a temperature of the exhaust gas.

17 Claims, 6 Drawing Sheets

METHOD FOR DESULFURIZATION OF SELECTIVE CATALYTIC REDUCTION DEVICES

The present disclosure relates to exhaust systems for internal combustion engines, and more particularly to exhaust systems using selective catalytic reduction (SCR) units for emission control.

Exhaust gas emitted from an internal combustion engine, particularly a diesel engine, is a heterogeneous mixture that contains gaseous emissions such as carbon monoxide ("CO"), unburned hydrocarbons ("HC"), oxides of nitrogen ("NOx"), oxides of sulfur ("SOx"), as well as condensed phase materials (liquids and solids) that constitute particulate matter ("PM"). Catalyst compositions, typically disposed on catalyst supports or substrates, are provided in an engine exhaust system as part of an after treatment system to convert certain, or all of these exhaust constituents into non-regulated exhaust gas components.

Exhaust gas treatment systems typically include selective catalytic reduction (SCR) devices. A SCR device includes a substrate having a SCR catalyst disposed thereon to reduce the amount of NOx in the exhaust gas. The typical exhaust treatment system also includes a reductant delivery system that injects a reductant such as, for example, ammonia ($NH_3$) or urea ($CO(NH_2)_2$, etc.). The SCR device makes use of $NH_3$ to reduce the NOx. For example, when the proper amount of $NH_3$ is supplied to the SCR device under the proper conditions, the $NH_3$ reacts with the NOx in the presence of the SCR catalyst to reduce the NOx emissions.

The presence of sulfur in SOx in the exhaust gas can "poison" or deactivate the SCR catalyst. As a result of exposure of the SCR catalyst to SOx, the ability of the SCR catalyst to reduce the NOx is diminished and accordingly the NOx conversion efficiency is reduced. To recover the NOx conversion efficiency, the SOx needs to be removed from the SCR catalyst via desulfurization (i.e., regeneration of the SCR catalyst). Desulfurization of the SCR catalyst may be accomplished by increasing the temperature of the exhaust gas above 550° C. via combustion of fuel in the internal combustion engine. However, such desulfurization methods result in increased fuel consumption and degradation of the SCR catalyst due to the exposure to such high temperatures. Thus, it would be desirable to provide improved methods for desulfurization of SCR devices.

SUMMARY

Described herein is an emissions control system for treating exhaust gas in a motor vehicle including an internal combustion engine. The emissions control system includes a selective catalytic reduction (SCR) device and a controller operably connected to the SCR device. The controller is configured to perform a desulfurization method to desulfurize the SCR device by injecting a reductant into the exhaust gas upstream from or into the SCR device and increasing a temperature of the exhaust gas.

In one aspect, the controller is programmed to inject the reductant and increase the temperature of the exhaust gas for a selected duration. The emissions control system further includes a temperature sensor operably connected to and in fluid communication with the exhaust gas. The temperature sensor is operably connected to the controller. The desulfurization method further includes measuring the temperature of the exhaust gas and after increasing the temperature of the exhaust gas, maintaining the temperature of the exhaust gas at a predetermined temperature until the end of the selected duration. The temperature of the exhaust gas is increased to 300° C. to 500° C. The selected duration is equal to or greater than 10 minutes.

In another aspect, the emissions control system further includes a downstream NOx sensor operably connected to and in fluid communication with the exhaust gas. The downstream NOx sensor is disposed downstream of the SCR device and operably connected to the controller and is configured to measure a downstream NOx value of the exhaust gas from the downstream NOx sensor. The desulfurization method further includes measuring the downstream NOx value from the downstream NOx sensor. If the downstream NOx value is equal to or greater than a NOx threshold value, the injecting of the reductant and the increasing of the temperature of the exhaust gas is initiated. The injecting of the reductant and the increasing of the temperature of the exhaust gas continues until at least one of: a selected duration ends and a downstream NOx value equal to or less than a selected NOx value is measured.

In yet another aspect, the emissions control system further includes a downstream NOx sensor operably connected to and in fluid communication with the exhaust gas, the downstream NOx sensor being disposed downstream of the SCR device and operably connected to the controller, and an upstream NOx sensor operably connected to and in fluid communication with the exhaust gas, the upstream NOx sensor being disposed upstream of the SCR device and operably connected to the controller. The downstream NOx sensor is configured to measure a downstream NOx value of the exhaust gas from the downstream NOx sensor. The upstream NOx sensor is configured to measure a upstream NOx value of the exhaust gas from the upstream NOx sensor. The desulfurization method further includes measuring a downstream NOx value from the downstream NOx sensor, measuring a upstream NOx value from the upstream NOx sensor, and determining a NOx conversion efficiency using the downstream NOx value and the upstream NOx value. If the NOx conversion efficiency is equal to or less than a NOx conversion efficiency lower limit, the injecting of the reductant and the increasing of the temperature of the exhaust is initiated. The injecting of the reductant and the increasing of the temperature of the exhaust gas continues until at least one of: a selected duration ends and a NOx conversion efficiency equal to or greater than a selected NOx conversion efficiency is determined. Further described herein is a vehicle including the above-described emissions control system.

A method for desulfurization of a selective catalytic reduction (SCR) device in a motor vehicle having an internal combustion engine and an emissions control system includes injecting a reductant into the exhaust gas and increasing a temperature of the exhaust gas. During the injecting of the reductant, a molar ratio of the reductant to a downstream NOx value is 0.5:1 to 4:1. In one example, the injecting of the reductant is in an amount equal to or greater than 200 ppm by weight, based on the total weight of the exhaust gas. In a further aspect, A method for controlling emissions in exhaust gas from a motor vehicle including an internal combustion engine includes treating the exhaust gas in a SCR device and desulfurizing the SCR device using the above-described desulfurization method.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory module that executes one or more software or firmware programs, a combinational logic circuit, and/or other suitable components that provide the described functionality.

Additionally, the term "exemplary" is used herein to mean "serving as an example, instance or illustration." The embodiments or designs described herein as "exemplary" are not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in Figure X may be labeled "Xa" and a similar feature in Figure Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Figure 1:
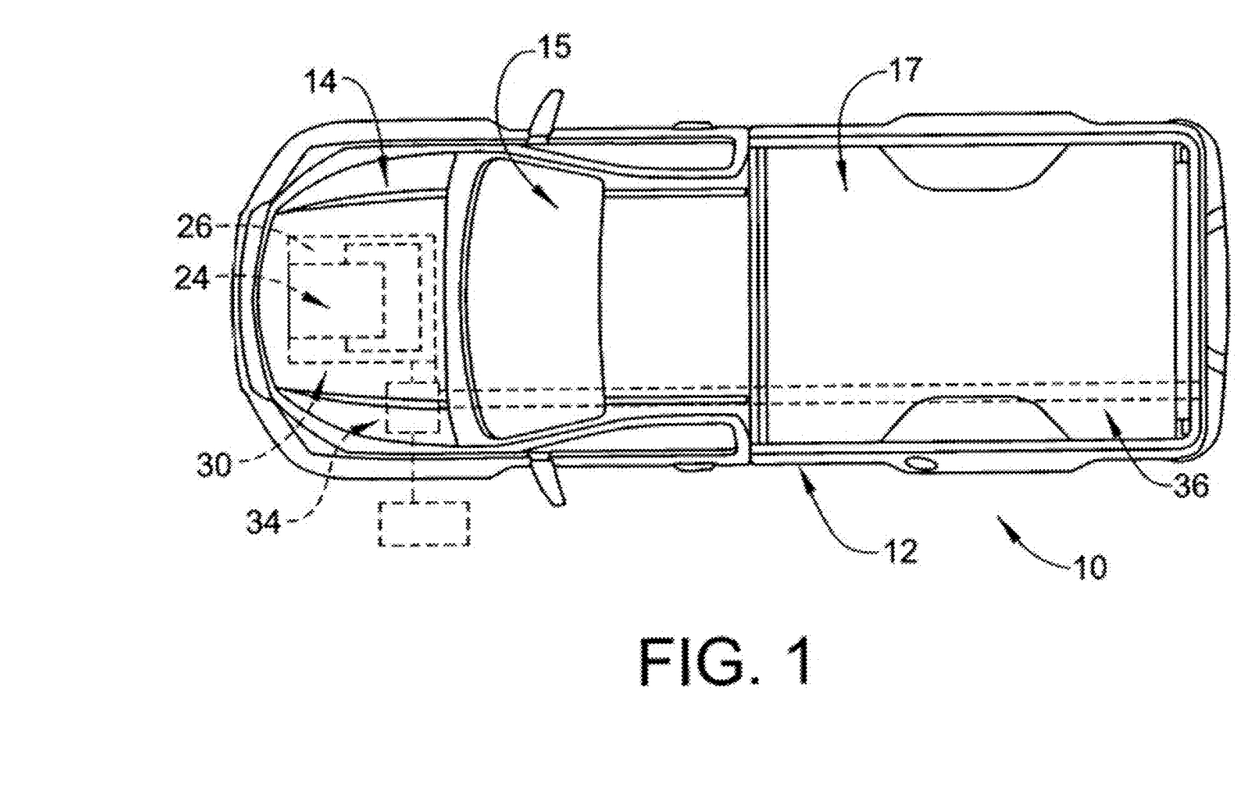
FIG. 1 depicts a motor vehicle including an internal combustion engine and an emission control system according to one or more embodiments.

A motor vehicle, in accordance with an aspect of an embodiment, is indicated generally at 10 in FIG. 1. Motor vehicle 10 is shown in the form of a pickup truck. It is to be understood that motor vehicle 10 may take on various forms including automobiles, commercial transports, marine vehicles, and the like. Motor vehicle 10 includes a body 12 having an engine compartment 14, a passenger compartment 15, and a cargo bed 17. Engine compartment 14 houses an internal combustion engine system 24, which, in the illustrative embodiment shown, may include a diesel engine 26. Internal combustion engine system 24 includes an exhaust system 30 that is fluidically connected to an after treatment or emissions control system 34. Exhaust produced by internal combustion engine (ICE) system 24 passes through emissions control system 34 to reduce emissions that may exit to ambient through an exhaust outlet pipe 36.

It should be noted that technical solutions described herein are germane to ICE systems 24 that can include, but are not limited to, diesel engine systems 26 and gasoline engine systems. The ICE system 24 can include a plurality of reciprocating pistons attached to a crankshaft, which may be operably attached to a driveline, such as a vehicle driveline, to power a motor vehicle (e.g., deliver tractive torque to the driveline). For example, the ICE system 24 can be any engine configuration or application, including various vehicular applications (e.g., automotive, marine and the like), as well as various non-vehicular applications (e.g., pumps, generators and the like). While the ICE 24 may be described in a vehicular context (e.g., generating torque), other non-vehicular applications are within the scope of this disclosure. Therefore, when reference is made to a motor vehicle, such disclosure should be interpreted as applicable to any application of an ICE system 24.

Moreover, an ICE system 24 can generally represent any device capable of generating an exhaust gas stream comprising gaseous (e.g., NOx, $O_2$, SOx), carbonaceous, and/or particulate matter species, and the disclosure herein should accordingly be interpreted as applicable to any such devices. As used herein, "exhaust gas" refers to any chemical species or mixture of chemical species which may require treatment, and includes gaseous, liquid, and solid species. For example, an exhaust gas stream may contain a mixture of one or more NOx species, one or more SOx species, one or more liquid hydrocarbon species, and one more solid particulate species (e.g., ash). It should be further understood that the embodiments described herein may be applicable to treatment of effluent streams not comprising carbonaceous and/or particulate matter species, and, in such instances, ICE 24 can also generally represent any device capable of generating an effluent stream comprising such species. Exhaust gas particulate matter generally includes carbonaceous soot, and other solid and/or liquid carbon-containing species which are germane to ICE exhaust gas or form within an emissions control system 34.

As used herein, "NOx" refers to one or more nitrogen oxides. NOx species can include $N_yO_x$ species, wherein y>0 and x>0. Non-limiting examples of nitrogen oxides can include NO, $NO_2$, $N_2O$, $N_2O_2$, $N_2O_3$, $N_2O_4$, and $N_2O_5$. As used herein, "SOx" refers to one or more sulfur oxides. SOx species can include $S_yO_x$ species, wherein y>0 and x>0. Non-limiting examples of nitrogen oxides can include SO, $SO_2$, $S_2O$, $S_2O_2$, $SO_3$, $SO_4$, $S_6O_2$, and $S_7O_2$.

Figure 2:
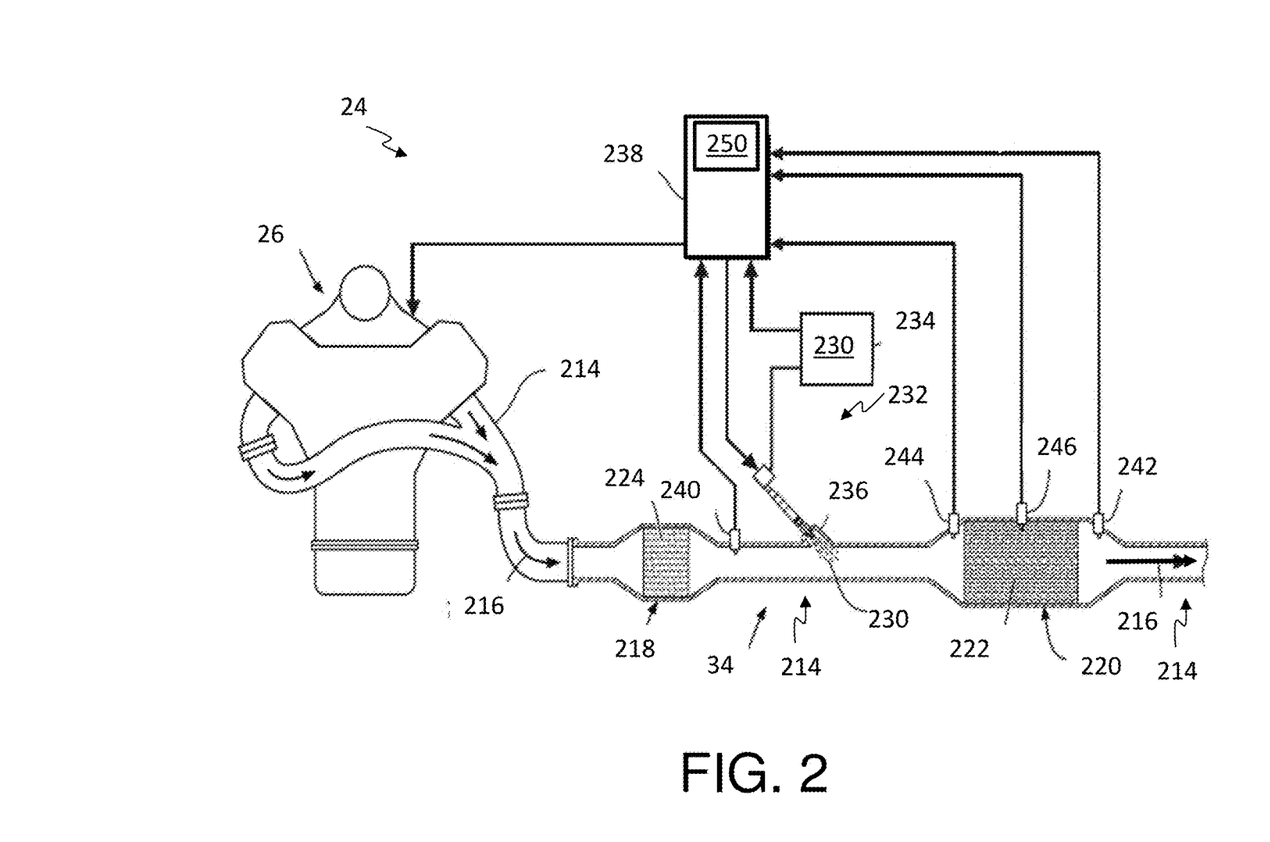
FIG. 2 illustrates example components of an emissions control system according to one or more embodiments.

FIG. 2 illustrates example components of the emissions control system 34 according to one or more embodiments. It should be noted that while the ICE system 24 includes a diesel engine 26 in the above example, the emissions control system 34 described herein can be implemented in various engine systems. The emissions control system 34 facilitates the control, monitoring of, and regeneration of NO, storage and/or treatment materials, to control exhaust produced by the ICE system 24. For example, the technical solutions herein provide methods for controlling and regenerating SCR devices, wherein the SCR devices are configured to receive exhaust gas streams from an exhaust gas source.

The exhaust gas conduit 214, which may comprise several segments, transports exhaust gas 216 from the engine 26 to the various exhaust treatment devices of the emissions control system 34. For example, as illustrated, the emission control system 34 includes a SCR device 220. In one or more examples, the SCR device 220 can include a selective catalytic reduction filter (SCRF) device, which provides the catalytic aspects of SCRs in addition to particulate filtering capabilities. Alternatively, or in addition, the SCR device 220 can also be coated on a flow through substrate. As can be appreciated, the emission control system 34 can include various additional treatment devices, including an oxidation catalyst (OC) device 218, and particulate filter devices (not shown), among others.

As can be appreciated, the OC device 218 can be of various flow-through, oxidation catalyst devices known in the art. In various embodiments the OC device 218 may include a flow-through metal or ceramic monolith substrate 224. The substrate 224 may be packaged in a stainless steel shell or canister having an inlet and an outlet in fluid communication with the exhaust gas conduit 214. The substrate 224 may include an oxidation catalyst compound disposed thereon. The oxidation catalyst compound may be applied as a washcoat and may contain platinum group metals such as platinum (Pt), palladium (Pd), rhodium (Rh) or other suitable oxidizing catalysts, or combination thereof. The OC device 218 is useful in treating unburned gaseous and non-volatile HC and CO, which are oxidized to form carbon dioxide and water. A washcoat layer includes a compositionally distinct layer of material disposed on the surface of the monolithic substrate 224 or an underlying washcoat layer. A catalyst can contain one or more washcoat layers, and each washcoat layer can have unique chemical catalytic functions. In the SCR device 220, the catalyst compositions for the SCR function and $NH_3$ oxidation function can reside in discrete washcoat layers on the substrate 224 or, alternatively, the compositions for the SCR device 220 and $NH_3$ oxidation functions can reside in discrete longitudinal zones on the substrate 224.

The SCR device 220 may be disposed downstream from the OC device 218. In one or more examples, the SCR device 220 includes a filter portion 222 that can be a wall flow filter, which is configured to filter or trap carbon and other particulate matter from the exhaust gas 216. The filter portion 222 can, for example, be a ceramic brick, a plate structure, or any other suitable structure such as a monolithic honeycomb structure that includes several hundred to several thousand parallel flow-through cells per square inch, although other configurations are suitable. Each of the flow-through cells can be defined by a wall surface on which the SCR catalyst composition can be washcoated. The filter portion 222 can be formed from a material capable of withstanding the temperatures and chemical environment associated with the exhaust gas 216. Some specific examples of materials that can be used include ceramics such as extruded cordierite, α-alumina, silicon carbide, silicon nitride, zirconia, mullite, spodumene, alumina-silica-magnesia, zirconium silicate, sillimanite, petalite, or a heat and corrosion resistant metal such as titanium or stainless steel. The filter portion 222 can comprise a non-sulfating $TiO_2$ material, for example. In at least one embodiment, the filter portion 222 is formed as a particulate filter (PF), such as a diesel particulate filter (DPF). The filter portion 222 (i.e., the PF) may be constructed, for example, using a ceramic wall flow monolithic exhaust gas filter substrate (not shown), which is packaged in a rigid, heat resistant shell or canister. The filter portion 222 has an inlet and an outlet in fluid communication with exhaust gas conduit 214 and may trap particulate matter as the exhaust gas 216 flows therethrough. It is appreciated that a ceramic wall flow monolith filter substrate is merely exemplary in nature and that the filter portion 222 may include other filter devices such as wound or packed fiber filters, open cell foams, sintered metal fibers, etc.

During treatment of an exhaust gas to control emissions, the SCR device 220 receives reductant 230. Reductant 230 can be supplied from a reductant supply source 234. In one or more examples, the reductant 230 is injected into the exhaust gas conduit 214 at a location upstream of the SCR device 220 using an injector 236, or other suitable method of delivery. The reductant 230 can be in the form of a gas, a liquid, or an aqueous solution, such as an aqueous urea solution (e.g., diesel exhaust fluid (DEF)). In one or more examples, the reductant 230 can be mixed with air in the injector 236 to aid in the dispersion of the injected reductant 230. The catalyst containing washcoat disposed on the filter portion 222 or a flow through catalyst or a wall flow filter may reduce NOx constituents in the exhaust gas 216. The SCR device 220 utilizes the reductant 230, such as ammonia ($NH_3$), to reduce the NOx. The catalyst containing washcoat may contain a porous and high surface area material such as zeolite and one or more base metal components such as iron (Fe), cobalt (Co), copper (Cu), or vanadium (V), sodium (Na), barium (Ba), titanium (Ti), tungsten (W), and combinations thereof, which can operate efficiently to convert NOx constituents of the exhaust gas 216 in the presence of $NH_3$. In a particular embodiment, the catalyst composition can contain a zeolite impregnated with one or more of copper, iron, or vanadium. In some embodiments the zeolite can be a β-type zeolite, a Y-type zeolite, a ZM5 zeolite, or any other crystalline zeolite structure such as a Chabazite or a USY (ultra-stable Y-type) zeolite. In a particular embodiment, the zeolite comprises Chabazite. In a particular embodiment, the zeolite comprises SSZ. Suitable SCR catalyst compositions can have high thermal structural stability, particularly when used in tandem with particulate filter (PF) devices or when incorporated into SCRF devices, which are regenerated via high temperature exhaust soot burning techniques. In one or more examples, a turbulator (i.e., mixer) (not shown) can also be disposed within the exhaust conduit 214 in close proximity to the injector 236 and/or the SCR device 220 to further assist in thorough mixing of reductant 230 with the exhaust gas 216 and/or even distribution throughout the SCR device 220.

The SCR catalyst composition can optionally further comprise one or more base metal oxides as promoters to further decrease the $SO_3$ formation and to extend catalyst life. The one or more base metal oxides can include $WO_3$, $Al_2O_3$, and $MoO_3$, in some embodiments. In one embodiment, $WO_3$, $Al_2O_3$, and $MoO_3$ can be used in combination with $V_2O_5$.

In one or more examples, the emissions control system 34 further includes a control module 238 operably connected via a number of sensors to monitor the engine 26 and/or the exhaust gas emission control system 34. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality. For example, control module 238 can execute control process as described herein and a SCR chemical model 250, as described below. The control module 238 can be operably connected to ICE system 24, SCR device 220, and/or one or more sensors. As shown, the sensors can include an upstream $NO_x$ sensor 240 and downstream $NO_x$ sensor 242 disposed downstream of SCR device 220. Each of the NOx sensors 240 and 242 are in fluid communication with exhaust gas 216 in the exhaust gas conduit 214. In one or more examples, the upstream NOx sensor 240 is disposed downstream of the ICE system 24 and upstream of both SCR device 220 and the injector 236. The upstream $NO_x$ sensor 240 and downstream $NO_x$ sensor 242 detect a $NO_x$ level proximate their location within exhaust gas conduit 214, and generate a NOx signal, which corresponds to the NOx level. A NOx level can comprise a concentration, a mass flow rate, or a volumetric flow rate, in some embodiments. A NOx signal generated by a NOx sensor 240 and 242 can be interpreted by control module 238, for example. Control module 238 can optionally be in communication one or more temperature sensors, such as upstream temperature sensor 244, disposed upstream from SCR device 220.

The sensors of the emissions control system 34 may further include at least one pressure sensor 246 (e.g., a delta pressure sensor). The delta pressure sensor 246 may determine the pressure differential (i.e., Δp) across the SCR device 220. Although a single delta pressure sensor 246 is illustrated, it is appreciated that a plurality of pressure sensors may be used to determine the pressure differential of the SCR device 220. For example, a first pressure sensor (not shown) may be disposed at the inlet of the SCR device 220 and a second pressure sensor (also not shown) may be disposed at the outlet of the SCR device 220. Accordingly, the difference between the pressure detected by the second pressure sensor and the pressure detected by the first pressure sensor may indicate the pressure differential across the SCR device 220. It should be noted that in other examples, the sensors can include different, additional, or fewer sensors than those illustrated/described herein.

The SCR catalyst generally uses the reductant 230 to reduce $NO_x$ species (e.g., NO and $NO_2$) to non-regulated components. Such components include one or more of species which are not $NO_x$ species, such as diatomic nitrogen, nitrogen-containing inert species, or species which are considered acceptable emissions, for example. The reductant 230 can be ammonia ($NH_3$), such as anhydrous ammonia or aqueous ammonia, or generated from a nitrogen and hydrogen rich substance such as urea ($CO(NH_2)_2$). Additionally or alternatively, the reductant 230 can be any compound capable of decomposing or reacting in the presence of exhaust gas 216 and/or heat to form ammonia. Equations (1)-(5) provide exemplary chemical reactions for $NO_x$ reduction involving ammonia.

$$6NO+4NH_3 \rightarrow 5N_2+6H_2O \qquad (1)$$

$$4NO+4NH_3+O_2 \rightarrow 4N_2+6H_2O \qquad (2)$$

$$6NO_2+8NH_3 \rightarrow 7N_2+12H_2O \qquad (3)$$

$$2NO_2+4NH_3+O_2 \rightarrow 3N_2+6H_2O \qquad (4)$$

$$NO+NO_2+2NH_3 \rightarrow 2N_2+3H_2O \qquad (5)$$

It should be appreciated that Equations (1)-(5) are merely illustrative, and are not meant to confine the SCR device 220 to a particular NOx reduction mechanism or mechanisms, nor preclude the operation of other mechanisms. The SCR device 220 can be configured to perform any one of the above NOx reduction reactions, combinations of the above NOx reduction reactions, and other NOx reduction reactions.

Though fuels used in the internal combustion engine may include, but are not limited to, ultra-low sulfur diesel, undesired parallel reactions can occur due to the presence of SOx in the exhaust gas. Equations (6)-(9) provide exemplary chemical reactions for SOx that can occur and poison the SCR catalyst.

$$SO_2+\tfrac{1}{2}O_2 \rightarrow SO_3 \qquad (6)$$

$$NH_3+SO_3+H_2O \rightarrow NH_4HSO_4 \qquad (7)$$

$$4NH_3+2SO_3+O_2+2H_2O \rightarrow 2(NH_4)_2SO_4 \qquad (8)$$

$$2NH_3+2SO_3+O_2+2H_2O \rightarrow 2NH_4(HSO_4) \qquad (9)$$

$$NH_3+SO_3+H_2O \rightarrow (NH_4)_2SO_4 \qquad (10)$$

In one or more embodiments, sulfur can react with the active metals such as copper in the SCR catalyst to form $CuSO_4$, further deactivating the catalyst. It should be appreciated that Equations (6)-(10) and the described reaction of sulfur with active metals are merely illustrative, and are not meant to confine the SCR device 220 to a particular mechanism or mechanisms, nor preclude the operation of other mechanisms.

During desulfurization, one or more of the reverse reactions of Equations (6)-(10) or a breakdown of copper sulfate and ammonium sulfate occurs, releasing sulfur oxide into the exhaust. Reductant can act as a catalyst for this reaction and allow for the reverse reaction(s) to occur at lower temperatures.

The reductant 230 can be diluted with water in various implementations. In implementations where the reductant 230 is diluted with water, heat (e.g., from the exhaust) evaporates the water, and ammonia is supplied to the SCR device 220. Non-ammonia reductants can be used as a full or partial alternative to ammonia as desired. In implementations where the reductant 230 includes urea, the urea reacts with the exhaust to produce ammonia, and ammonia is supplied to the SCR device 220. Reaction (11) below provides an exemplary chemical reaction of ammonia production via urea decomposition.

$$CO(NH_2)_2+H_2O \rightarrow 2NH_3+CO_2 \qquad (11)$$

It should be appreciated that Equation (11) is merely illustrative, and is not meant to confine the urea or other reductant 230 decomposition to a particular single mechanism, nor preclude the operation of other mechanisms.

The SCR catalyst can store (i.e., absorb, and/or adsorb) reductant 230 for interaction with exhaust gas 216. For example, the reductant 230 can be stored within the SCR device 220 or catalyst as ammonia. A given SCR device 220 has a reductant capacity, or an amount of reductant or reductant derivative it is capable of storing. The amount of reductant 230 stored within an SCR device 220 relative to the SCR catalyst capacity can be referred to as the SCR "reductant loading", and can be indicated as a % loading (e.g., 90% reductant loading) in some instances. During operation of SCR device 220, injected reductant 230 is stored in the SCR catalyst and consumed during reduction reactions with NOx species. In one or more embodiments, the reductant 230 can be continually replenished. Determining the precise amount of reductant 230 to inject maintains exhaust gas emissions at acceptable levels. Insufficient reductant levels within the emissions control system 34 (e.g., within SCR device 220) can result in undesirable NOx species emissions ("NOx breakthrough") from the emissions control system (e.g., via a vehicle tailpipe), while excessive reductant 230 injection can result in undesirable amounts of reductant 230 passing through the SCR device 220 unreacted or exiting the SCR device 220 as an undesired reaction product. SCR dosing logic can be utilized to command reductant 230 dosing, and adaptations thereof, and can be implemented by control module 238, for example.

A reductant injection dosing rate (e.g., grams per second) can be determined by SCR chemical model 250 which, among other things, predicts the amount of reductant 230 stored in the SCR device 220 based on signals from one or more of reductant 230 injection (e.g., feedback from injector 236) and upstream NOx (e.g., $NO_x$ signal from upstream NOx sensor 242 also denoted as $NO_{x1}$). The SCR chemical model 250 further predicts NOx levels of exhaust gas 216 discharged from the SCR device 220. The SCR chemical model 250 can be implemented by control module 238. The SCR chemical model 250 can be updatable by one or more process values over time, for example.

In one or more examples, the percentage of NOx that is removed from the exhaust gas 216 transiting the SCR device 220 may be referred to as a NOx conversion efficiency of the SCR device 220. The control module 238 may determine the NOx conversion efficiency of the SCR device 220 based on $NOx_{in}$ and $NOx_{out}$ signals generated by the first (upstream) NOx sensor 240 and second (downstream) NOx sensor 242, respectively. For example, the control module 238 may determine the NOx conversion efficiency of the SCR device 220 (SCReff) based on the following equation:

$$SCReff=(NOx_{in}-NOx_{out})/NOxin \quad (12)$$

A desired conversion efficiency can be determined by many factors, such as the characteristics of SCR catalyst type and/or operating conditions of the system (e.g., ICE system 24 operating parameters). However, in some instances, in the steady state operating mode of the ICE, sulfur in the exhaust can deactivate or poison the SCR catalyst of portions of the SCR catalyst due to accumulation of SOx on the SCR catalyst. This occurrence causes a reduction in the $NO_x$ conversion efficiency or an increase in NOx concentration or flow rate in exhaust gas 216 downstream of the SCR device 220, which can result in undesirable NOx breakthrough. This leads to operation of the SCR device 220 that does not fully achieve a desired NOx conversion rate or a desired $NO_x$ concentration or flow rate in exhaust gas 216 downstream of the SCR device 220, or conversely may introduce excessive reductant 230. Under such conditions the desulfurization of the SCR device 220 restores at least a portion of the $NO_x$ conversion efficiency of the SCR device 220 to ensure the desired emissions.

The technical features described herein facilitate the emissions control system 34 to desulfurize the SCR catalyst and regenerate the SCR catalyst to a NOx conversion efficiency at or near the initial NOx conversion efficiency (i.e., the NOx conversion efficiency of the SCR device before exposure to sulfur). Upon detection of NOx breakthrough, detection of a decrease in NOx conversion efficiency, or at a selected interval, the method of desulfurization of the SCR catalyst can include injecting reductant into the exhaust gas upstream from or into the SCR device and increasing the temperature of the exhaust gas. Surprisingly, injecting reductant into the exhaust gas while increasing the temperature of the exhaust gas, desulfurization can be carried out at lower temperatures (e.g., 300° C. to 500° C.) than the temperatures used previously (e.g., greater than 550° C.) that did not inject reductant during desulfurization. In addition, the presence of the reductant results in the SCR device 220 having a higher NOx conversion efficiency after desulfurization as compared to desulfurization methods that do not include injecting reductant into the exhaust gas. In one or more examples, the NOx conversion efficiency of the SCR device 220 can be regenerated to equal to or greater than 90%, or equal to or greater than 95%, or equal to or greater than 99%, of the initial NOx conversion efficiency of the SCR device 220. Moreover, in one or more examples, the desulfurization may be completed in less time due to the use of the reductant.

The injecting of the reductant during desulfurization can be the same or a different dose (e.g., a higher dose) than the reductant dose used during treatment of the exhaust gas to control emissions. The reductant dosing rate can be adapted to achieve a desired NOx concentration or flow rate in exhaust gas 216 downstream of the SCR device 220 or achieve a desired NOx conversion efficiency. In addition, $NH_3$ may desorb from the SCR catalyst as the temperature increases, such as at times when the $NH_3$ storage level is near to the maximum $NH_3$ storage level. The reductant dosing rate during desulfurization can take into account this desorption, as well as take into account the amount of reductant present in the reductant supply 230 to avoid undesired or premature depletion of the reductant supply. In one or more embodiments, the amount of reductant desorbed from the SCR catalyst as the temperature increases (e.g., to 400° C. and higher) is near to maximum $NH_3$ storage level and the amount of $NH_3$ stored in the SCR catalyst is zero. The injecting of the reductant 230 during desulfurization allows for lower temperatures to be used for desulfurization and can provide additional NOx reduction. In one or more examples, a molar ratio of the reductant injected during desulfurization to the downstream NOx value is 0.5:1 to 4:1 (i.e., a molar ratio of $NH_3$ can be 0.5 times to 4 times the downstream NOx value). For example, a downstream NOx value can be 200 parts per million by weight (ppm) and injected $NH_3$ can be injected in an amount of 50 ppm to 800 ppm. In an example with a downstream NOx value of 400 ppm, $NH_3$ can be injected in an amount of 200 ppm to 1,600 ppm achieve efficiently desulfurization to obtain a high NOx conversion efficiency of the regenerated SCR catalyst.

The increase in the temperature can be controlled by increasing the fuel consumed by the internal combustion engine to produce the exhaust gas. In one or more examples, the increasing of the temperature of the exhaust gas can be implemented by the controller 238 based on a selected rate of fuel consumption (e.g., a predetermined increased rate of fuel fed to the internal combustion engine). In other examples, the increasing of the temperature of the exhaust gas can be implemented based on the temperature measured by the temperature sensor 244. The temperature of the exhaust gas may be increased until a selected temperature is reached and then maintained for the remaining duration of the desulfurization method. For example, the temperature can be increase to 300° C. to 500° C., or to 350° C. to 450° C.

As noted, the initiation of the desulfurization method can be based on the NOx level in the exhaust gas (e.g., downstream from the SCR device 220), the NOx conversion efficiency, or at a selected interval. As discussed herein, in reference to FIG. 3 and FIG. 4, the NOx level measured in the exhaust gas downstream can trigger the controller 238 to implement the desulfurization method. In one or more examples, the $NOx_{out}$ signal can exceed a NOx threshold value (e.g., a predetermined NOx value indicating NOx breakthrough) and, in response, the controller 238 can implement the desulfurization method by initiating the injecting of the reductant and the increasing of the temperature of the exhaust gas. As discussed herein, in reference to FIG. 5, the NOx conversion efficiency calculated by the controller 238 can be equal to or less than a NOx conversion efficiency lower limit. In response, the controller 238 can implement the desulfurization method. Alternatively, the controller 238 can implement the desulfurization method at selected intervals. For example, desulfurization can be implemented based on a predetermined time interval of ICE 24 usage, an amount of exhaust gas flowed through the SCR device 220, or an amount of fuel consumed.

Regardless of the basis for initiating the desulfurization method, the duration of the desulfurization method (i.e., the duration of the injection of the reductant and the increasing of the temperature of the exhaust gas) and the end of the desulfurization method can also be predicated on different variables. As described herein, in reference to FIG. 3, the desulfurization method can be implemented by the controller 238 for a selected duration (i.e., a predetermined amount of time). As described herein in reference to FIG. 4, the desulfurization can be continued until a downstream NOx value equal to or less than a selected NOx value is reached. The selected NOx value can be a predetermined NOx value (e.g., zero or a NOx value less than the NOx threshold value, but greater than zero). As described herein in reference to FIG. 5, the desulfurization can be continued until a NOx conversion efficiency equal to or greater than a selected NOx conversion efficiency is reached. The selected NOx conversion efficiency can be the same as the initial NOx conversion efficiency, a predetermined percentage of the initial NOx conversion efficiency, or a predetermined NOx conversion efficiency (e.g., a NOx conversion efficiency greater than the NOx conversion efficiency lower limit, but less than the initial NOx conversion efficiency).

The NOx threshold value, the selected NOx value, the NOx conversion efficiency lower limit, and the selected NOx conversion efficiency can depend on emission targets and emission system specifications. In one or more embodiments, the selected NOx conversion efficiency at a certain engine operating condition may be 90%. If the NOx conversion efficiency decreases by more than 10% (so that the NOx conversion efficiency is less than 80%), desulfurization of the SCR catalyst can be initiated. In one example, desulfurization can occur during DPF regeneration, which is used to burn off soot in the DPF at a frequency of every 300 miles to 700 miles. Lowering of desulfurization temperature due to reductant injection makes combining DPF regeneration and SCR desulfurization feasible as the SCR temperatures achieved in some emissions control systems are 400° C. If desulfurization can be carried out with DPF regeneration, then the SCR catalyst NOx conversion efficiency would not decrease due to desulfurization. If NOx conversion efficiency decreases, it would be due to some other reason.

The use of such techniques that utilize the NOx values or the NOx conversion efficiency as the basis for initiation of the desulfurization method advantageously can prevent increasing the use of the reductant or consumption of fuel when desulfurization of the SCR device 220 is not needed or could be delayed.

During the desulfurization of the SCR device, a regeneration of the filter portion 222 can simultaneously be carried out by burning off the particulate matter trapped in the filter substrate, in one or more examples.

Figure 3:
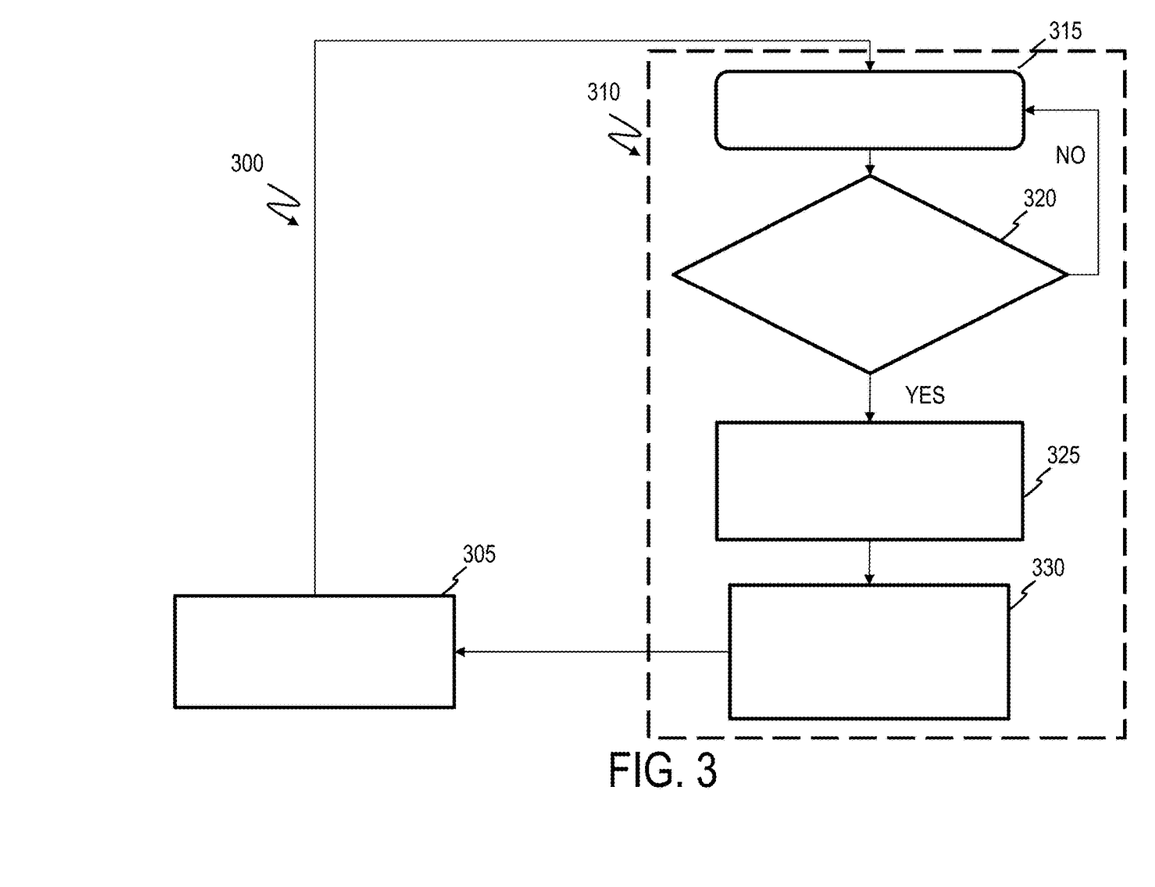
FIG. 3 illustrates a flowchart of an illustrative method for controlling emissions in exhaust gas from a motor vehicle including an internal combustion engine.

FIG. 3 illustrates a flowchart of an exemplary method 300 for controlling emissions in an exhaust gas according to one or more embodiments. The method 300 is implemented by the controller 238, in one or more examples. Alternatively, the method 300 is implemented by one or more electric circuits. In one or more examples, the method 300 is implemented by execution of logic that may be provided or stored in the form of computer readable and/or executable instructions.

The method 300 includes treating the exhaust gas in SCR device 220 to control emissions as shown at 305. The method 300 continues with desulfurizing SCR device 220 using desulfurization method 310. Desulfurization method 310 includes measuring the downstream NOx value of the exhaust gas produced by the engine, as shown at process step 315. The measuring of the downstream NOx value can be at periodic time intervals or continuously during the process step of treating the exhaust gas in SCR device 220. In an embodiment, during a steady state operating condition corresponding to a condition where the vehicle 10 is motoring (e.g., injection of fuel, engine speed, or engine load is substantially constant) and the NOx conversion efficiency is not reduced or is insubstantially reduced due to sulfur poisoning or another other operational variance, the downstream NOx value can be below a NOx threshold value.

If the downstream NOx value is determined by the controller 238 to be equal to or greater than the NOx threshold value at process step 320, the method injects reductant into the exhaust gas upstream from or into the SCR device 220 and increases the temperature of the exhaust gas for a selected duration (e.g., a duration set by a timer such as 10 minutes or another predetermined duration), as shown at process step 325. If, however, the downstream NOx value is determined to be below the NOx threshold value, the method continues to treat the exhaust gas in SCR device 220 as shown in process step 305 and periodically measures and compares the downstream NOx value with the NOx threshold value. In one or more embodiments, the selected duration for the desulfurization method may be selected as a calibratable interval depending on factors and operational parameters associated with the emission control system 34. For instance, the selected duration can be based on a predicted rate of desulfurization of the SCR catalyst based on 1) a selected rate of injection of reductant and 2) a predicted amount of sulfur in the SCR catalyst due to exposure to exhaust gas from the combustion of a predetermined amount of an ultra-low sulfur fuel.

The NOx threshold value may correspond to a predetermined concentration of NOx, such as 37.5 ppm (or another value). For example, the predetermined value may be calibrated to a modeled downstream NOx value that is considered acceptable. It should be noted that in one or more examples, the NOx measurement used may be a NOx flow rate, or another NOx attribute (instead of the NOx concentration).

The method further includes measuring the temperature of the exhaust gas and maintaining the temperature of the exhaust gas at a selected temperature until the end of the selected duration at process step 330. Upon ending the desulfurization method 310, the SCR device has been regenerated and normal operation of the emissions control system 34 resumes with treating the exhaust gas in the SCR device 220 at process step 305.

Figure 4:
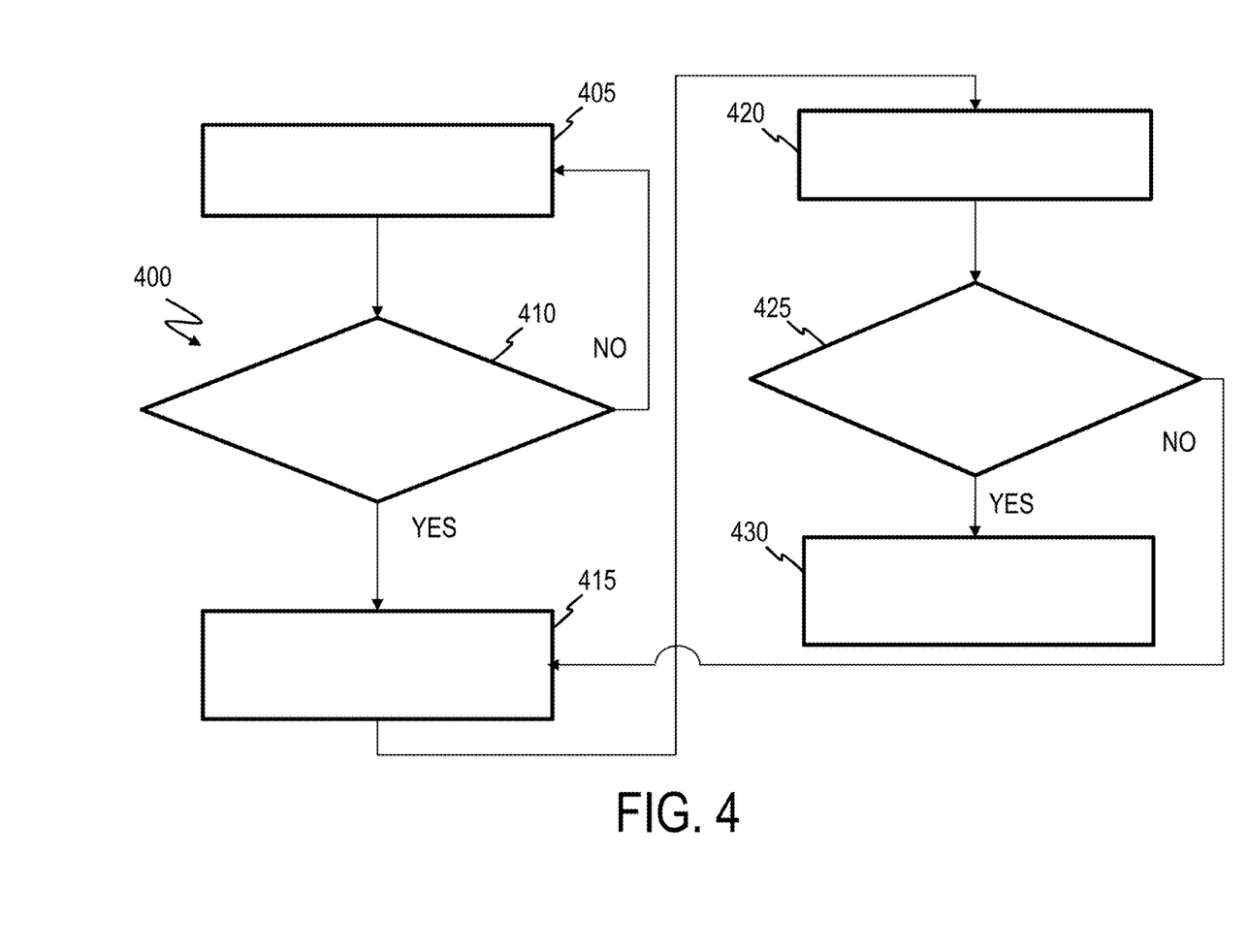
FIG. 4 illustrates a flowchart of an illustrative method for desulfurization of a SCR device.

FIG. 4 illustrates a flowchart of an exemplary method 400 for desulfurization according to one or more embodiments.

In an embodiment, the methodology 400 is implemented and performed as an alternative to the desulfurization method 310 as described with respect to FIG. 3. The methodology employs the downstream NOx sensor 242 to evaluate operation and infer status of the SCR device 220. The method 400 is also implemented by the controller 238, in one or more examples. Alternatively, the method 400 is implemented by one or more electric circuits. In one or more examples, the method 400 is implemented by execution of logic that may be provided or stored in the form of computer readable and/or executable instructions.

The method 400 initiates with measuring the downstream NOx value using NOx sensor 242 at process step 405. Turning to process step 410, in an embodiment, the method continues with evaluating the state of the emission control system 34. At process step 410, the controller 238 receives and compares the downstream NOx level with a NOx threshold value. If the downstream NOx value is greater than or equal to the NOx threshold value (a predetermined NOx value), then desulfurization method 400 initiates process step 415 to desulfurize the SCR catalyst. If, however, the downstream NOx value is not greater than or equal to the NOx threshold value, the controller 238 continues to periodically measure and receive the NOx measurement from the downstream NOx sensor 242 until the downstream NOx value measured is greater than or equal to the NOx threshold value.

Upon initiation of the desulfurization of the SCR catalyst at process step 415, the method 400 injects reductant upstream from or into the SCR device 220 and increases the temperature of the exhaust gas. Concurrently with process step 415, the method 400 at process step 425 continues to periodically receive the NOx measurement from the downstream NOx sensor 242 at process step 420 until it is determined that the downstream NOx value is equal to or less than a selected NOx value. If the downstream NOx value is not equal to or less the selected NOx value, the method continues to perform process steps 415, 420, and 425. If the downstream NOx value is equal to or less than the selected NOx value (second predetermined value), the controller 238 ends the injecting of the reductant and the increase of the temperature of the exhaust gas, as shown at 430. Thus, it is determined that desulfurization of the SCR catalyst is complete and the NOx level downstream from the SCR device 220 is under the desired predetermined level.

Figure 5:
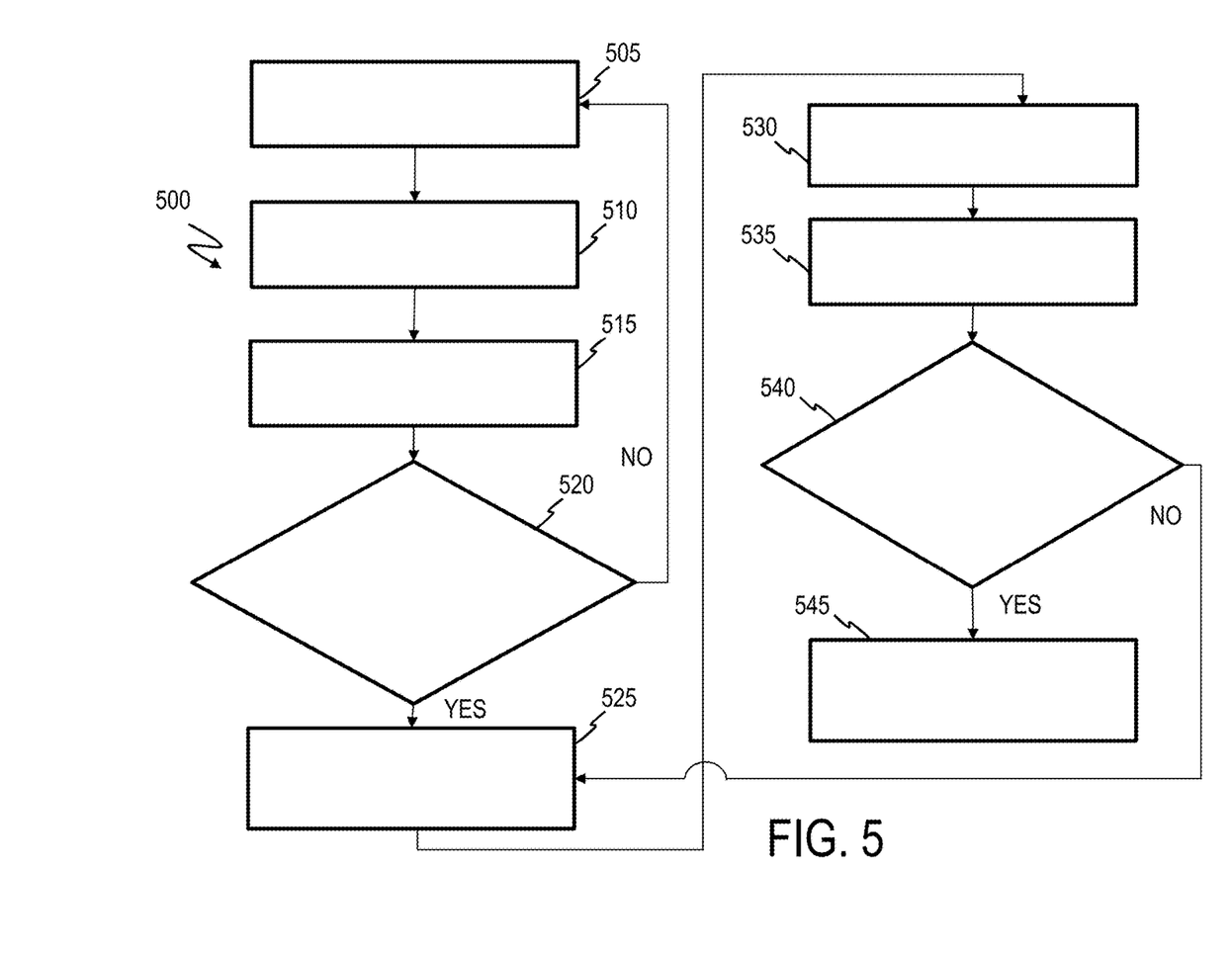
FIG. 5 illustrates a flowchart of another illustrative method for desulfurization of a SCR device.

FIG. 5 illustrates a flowchart of an exemplary method 500 for desulfurization according to one or more embodiments. In an embodiment, the methodology 500 is implemented and performed as an alternative to the desulfurization method 310 as described with respect to FIG. 3. The methodology employs the downstream NOx sensor 242 and upstream NOx sensor 242 to evaluate operation and infer status of the SCR device 220. The method 500 is also implemented by the controller 238, in one or more examples. Alternatively, the method 500 is implemented by one or more electric circuits. In one or more examples, the method 500 is implemented by execution of logic that may be provided or stored in the form of computer readable and/or executable instructions.

The desulfurization method 500 of FIG. 5. initiates with measuring the downstream NOx value using the NOx sensor 242 downstream from SCR device 220 at process step 505 and measuring the upstream NOx value using NOx sensor 242 upstream from SCR device 220 at process step 510. Turning to process step 515, in an embodiment, the method continues with evaluating the state of the emission control system 34 by determining the NOx conversion efficiency using the downstream NOx value and upstream NOx value.

At process step 520, the desulfurization method 500 continues with the controller 238 comparing the NOx conversion efficiency with a NOx conversion efficiency lower limit (a predetermined NOx conversion efficiency value). If the NOx conversion efficiency is equal to or less than the NOx conversion efficiency lower limit, then the method 500 initiates process step 525 to desulfurize the SCR catalyst. If, however, the NOx conversion efficiency is not equal to or less than the NOx conversion efficiency lower limit, the controller 238 continues to periodically measure and receive the NOx measurement from the downstream NOx sensor 242 and the NOx measurement from the downstream NOx sensor 242 until the NOx conversion efficiency is determined to be equal to or less than the NOx conversion efficiency lower limit and the method continues to perform process steps 505, 510, 515, and 520.

Upon initiation of the desulfurization of the SCR catalyst at process step 525, the method 500 injects reductant upstream from or into the SCR device 220 and increases the temperature of the exhaust gas. Concurrently with process step 525, the method at process step 530 continues to periodically receive the NOx measurement from the downstream NOx sensor 242 and the NOx measurement from the downstream NOx sensor 242 at process steps 530 and 535, until it is determined at process step 540 that NOx conversion efficiency is equal to or greater than a selected NOx conversion efficiency (second predetermined value). If the NOx conversion efficiency is not equal to or greater than the selected NOx conversion efficiency, the method continues to perform process steps 525, 530, 535, and 540. If the NOx conversion efficiency is equal to or greater than the selected NOx conversion efficiency, the controller 238 ends the injecting of the reductant and increase of the temperature of the exhaust gas, as shown at process step 545. Thus, it is determined that NOx conversion efficiency is sufficiently recovered and the SCR catalyst desulfurization is complete.

The technical features herein facilitate the emission control system used in combustion engines to more effectively regenerate the SCR catalyst that is at least partially poisoned by the presence and accumulation of sulfur therein. In particular, the method of desulfurization uses reductant to allow for lower temperatures (e.g., 300° C. to 500° C.) during desulfurization that result in less or no degradation of the SCR catalyst and less fuel consumed during desulfurization.

In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set), or generally a device for executing software.

The memory can include one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or another entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, such as a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance, but not limited to, a modulator/demodulator (modem; for accessing another device, system, or network), a radio frequency (RF) or other transceiver, a telephonic interface, a bridge, a router, etc.

One should note that the FIGS. 3, 4, and 5, show the architecture, functionality, and/or operation of a possible implementation of software. In this regard, one or more of the blocks can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the functionality described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" contains, stores, communicates, propagates and/or transports the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a non-exhaustive list) of a computer-readable medium include a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical).

EXAMPLES

Initial NOx conversion efficiency: A SCR catalyst aged at 750° C. for 72 hours in air with 10 weight % water (copper metal on a zeolite support in the form of chabazite) was tested for NOx conversion efficiency using an exhaust gas having the following composition: 10 volume % oxygen, 5 volume % water, 8 volume % carbon dioxide, and 400 ppm (by volume) NO, all based on the total volume of the exhaust gas. The space velocity of the exhaust gas fed to the SCR catalyst was 40,000/hour and the temperature was 250° C.

Poisoned SCR catalyst NOx conversion efficiency: The SCR catalyst was exposed to $SO_2$ (4 grams per liter of exhaust gas) at a temperature of 250° C. to obtain a poisoned SCR catalyst. The poisoned SCR catalyst was then tested for NOx conversion efficiency as described in the preceding paragraph.

Example 1

The poisoned SCR catalyst was then desulfurized by increasing the temperature of the exhaust gas and maintaining the temperature at 450° C. for 30 minutes while injecting 200 ppm of ammonia into the exhaust gas upstream from the SCR catalyst. The NOx conversion efficiency was them measured at 250° C.

Example 2

The poisoned SCR catalyst was desulfurized by increasing the temperature of the exhaust gas and maintaining the temperature at 450° C. for 30 minutes. The NOx conversion efficiency was them measured at 250° C.

Figure 6:
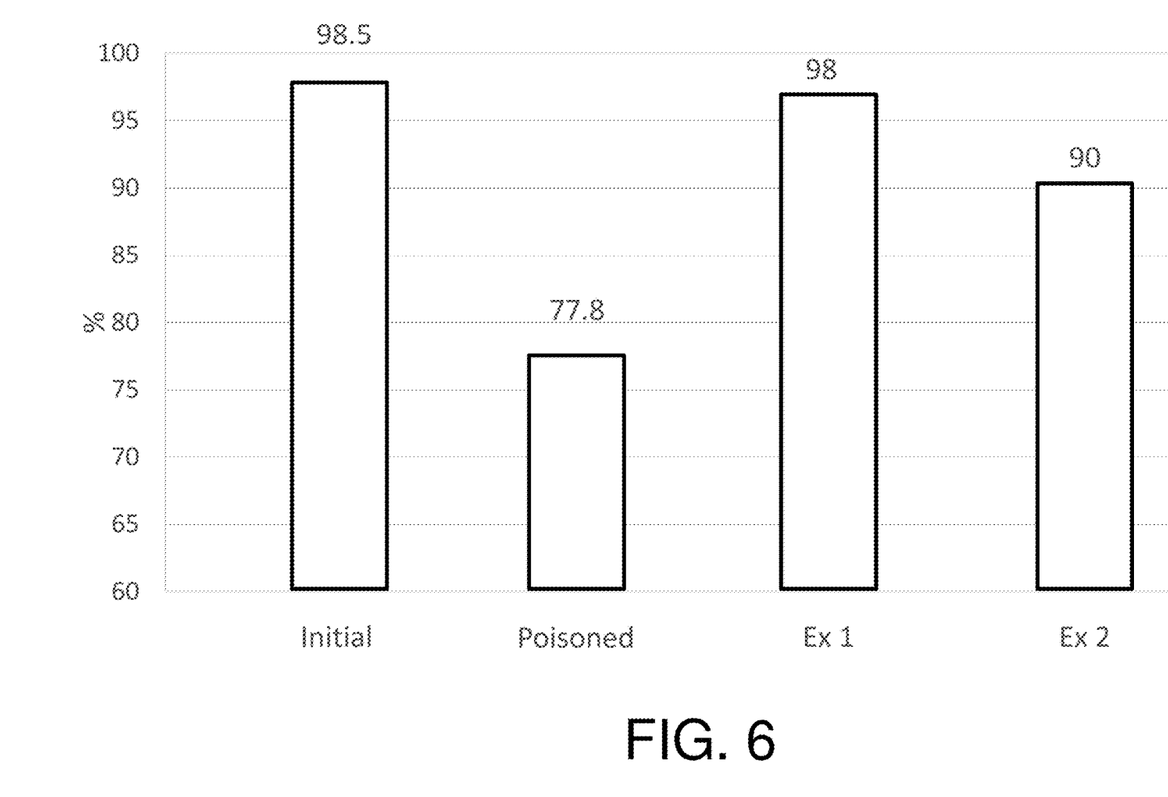
FIG. 6 illustrates a diagram of the NOx conversion efficiency for Examples 1 and 2.

As shown in FIG. 6, the SCR catalyst of Example 1 was regenerated to a NOx conversion efficiency of 98%, whereas SCR catalyst of Example 2 was regenerated to a lower NOx conversion efficiency of 90%. Thus, it was shown that injecting reductant during desulfurization improves NOx conversion efficiency and quickly, while allowing for the use of a low temperature.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the above disclosure has been described with reference to illustrative embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An emissions control system for treating exhaust gas in a motor vehicle including an internal combustion engine, the emissions control system comprising:
a selective catalytic reduction (SCR) device;
a controller operably connected to the SCR device and configured to perform a desulfurization method to desulfurize the SCR device by:
injecting a reductant into the exhaust gas upstream from or into the SCR device; and
increasing a temperature of the exhaust gas;
a downstream NOx sensor operably connected to and in fluid communication with the exhaust gas, the downstream NOx sensor disposed downstream of the SCR device and operably connected to the controller; and
an upstream NOx sensor operably connected to and in fluid communication with the exhaust gas, the upstream NOx sensor disposed upstream of the SCR device and operably connected to the controller,
wherein the downstream NOx sensor is configured to measure a downstream NOx value of the exhaust gas from the downstream NOx sensor, and
wherein the upstream NOx sensor is configured to measure a upstream NOx value of the exhaust gas from the upstream NOx sensor, and
wherein the desulfurization method further comprises:
measuring a downstream NOx value from the downstream NOx sensor;
measuring an upstream NOx value from the upstream NOx sensor; and
determining a NOx conversion efficiency using the downstream NOx value and the upstream NOx value,
wherein, if the NOx conversion efficiency is equal to or less than a NOx conversion efficiency lower limit, the injecting of the reductant and the increasing of the temperature of the exhaust is initiated.

2. The emissions control system of claim 1, wherein the controller is programmed to inject the reductant and increase the temperature of the exhaust gas for a selected duration.

3. The emissions control system of claim 2, further comprising a temperature sensor operably connected to and in fluid communication with the exhaust gas, the temperature sensor operably connected to the controller, wherein desulfurization method further comprises:
measuring the temperature of the exhaust gas; and
after increasing the temperature of the exhaust gas, maintaining the temperature of the exhaust gas at a predetermined temperature until the end of the selected duration.

4. The emissions control system of claim 1, wherein the temperature of the exhaust gas is increased to 300° C. to 500° C.

5. The emissions control system of claim 1, further comprising:
a downstream NOx sensor operably connected to and in fluid communication with the exhaust gas, the downstream NOx sensor disposed downstream of the SCR device and operably connected to the controller,
wherein the downstream NOx sensor is configured to measure a downstream NOx value of the exhaust gas from the downstream NOx sensor, and
wherein the desulfurization method further comprises:
measuring the downstream NOx value from the downstream NOx sensor,
wherein, if the downstream NOx value is equal to or greater than a NOx threshold value, the injecting of the reductant and the increasing of the temperature of the exhaust gas is initiated.

6. The emissions control system of claim 5, wherein the injecting of the reductant and the increasing of the temperature of the exhaust gas continues until at least one of:
a selected duration ends; and
a downstream NOx value equal to or less than a selected NOx value is measured.

7. The emissions control system of claim 1, wherein the injecting of the reductant and the increasing of the temperature of the exhaust gas continues until at least one of:
a selected duration ends; and
a NOx conversion efficiency equal to or greater than a selected NOx conversion efficiency is determined.

8. A vehicle comprising the emissions control system of claim 1.

9. A desulfurization method for desulfurizing a selective catalytic reduction (SCR) device treating an exhaust gas, comprising:
injecting a reductant into the exhaust gas upstream from or into the SCR device;
increasing a temperature of the exhaust gas;
measuring a downstream NOx value from a downstream NOx sensor;
measuring an upstream NOx value from an upstream NOx sensor; and
determining a NOx conversion efficiency using the downstream NOx value and the upstream NOx value,
wherein, if the NOx conversion efficiency is equal to or less than a NOx conversion efficiency lower limit, the injecting of the reductant and the increasing of the temperature of the exhaust is initiated.

10. The desulfurization method of claim 9, wherein the injecting of the reductant and the increasing of the temperature continues for a selected duration to desulfurize the SCR device, wherein the selected duration is equal to or greater than 10 minutes.

11. The desulfurization method of claim 10, further comprising:
measuring the temperature of the exhaust gas; and
after increasing the temperature of the exhaust gas, maintaining the temperature of the exhaust gas at a desulfurization temperature until the end of the selected duration.

12. The desulfurization method of claim 9, further comprising:
measuring a downstream NOx value of the exhaust gas,
wherein, if the downstream NOx value is equal to or greater than a NOx threshold value, the injecting of the reductant and the increasing of the temperature of the exhaust gas is initiated.

13. The desulfurization method of claim 12, wherein the injecting of the reductant and the increasing of the temperature of the exhaust gas continues until at least one of:
a selected duration ends; and
a downstream NOx value equal to or less than a selected NOx limit value is measured.

14. The desulfurization method of claim 12, wherein, during the injecting of the reductant, a molar ratio of the reductant to the downstream NOx value is 0.5:1 to 4:1.

15. The desulfurization method of claim 9, wherein the injecting of the reductant and the increasing of the temperature of the exhaust gas continues until at least one of:

a selected duration ends; and a NOx conversion efficiency equal to or greater than a selected NOx conversion efficiency is determined.

16. The desulfurization method of claim 9, wherein the injecting of the reductant is in an amount equal to or greater than 200 ppm by weight, based on the total weight of the exhaust gas.

17. A method for controlling emissions in exhaust gas from a motor vehicle including an internal combustion engine, comprising:

treating the exhaust gas in a selective catalytic reduction (SCR) device; and desulfurizing the SCR device using the desulfurization method of claim 9.

* * * * *